United States Patent [19]

Salter

[11] 4,134,023

[45] Jan. 9, 1979

[54] APPARATUS FOR USE IN THE EXTRACTION OF ENERGY FROM WAVES ON WATER

[75] Inventor: Stephen H. Salter, Edinburgh, Scotland

[73] Assignee: The Secretary of State for Energy in Her Britannic Majesty's Government of the United Kingdom of Great Britain and Northern Ireland, England

[21] Appl. No.: 759,274

[22] Filed: Jan. 14, 1977

[30] Foreign Application Priority Data

Jan. 20, 1976 [GB] United Kingdom ................ 2224/76

[51] Int. Cl.² .............................................. F03B 13/10
[52] U.S. Cl. ....................................... 290/42; 290/43
[58] Field of Search ....................... 290/42, 43, 53, 54; 60/398, 495–505

[56] References Cited

U.S. PATENT DOCUMENTS

| 3,928,967 | 12/1975 | Salter | 60/398 |
| 4,048,512 | 9/1977 | Wood | 290/42 |

Primary Examiner—James R. Scott
Assistant Examiner—M. K. Mutter
Attorney, Agent, or Firm—Larson, Taylor & Hinds

[57] ABSTRACT

In a nodding duck for extracting power from waves on water, a control system is incorporated for generating a feedback force related to one or more of the parameters of movement, viz. the displacement position, velocity or acceleration of the duck. The relationship between the feedback force and the parameter is chosen to control the response of the duck for example to enhance the coupling between waves and the duck over a broader range of wave frequencies than would be practicable in the absence of the control system.

16 Claims, 5 Drawing Figures

APPARATUS FOR USE IN THE EXTRACTION OF ENERGY FROM WAVES ON WATER

The invention relates to apparatus for use in the extraction of power from waves on water, particularly waves on the sea from the relative movement of a body on the water surface, which body is moved by waves, and a part which is restrained from such movement by waves.

The apparatus of the invention has particular application to a device in which the body is a duck of the kind defined in U.S. Pat. No. 3,928,967.

As explained in that U.S. Pat. No. 3,928,967 certain parameters of the duck must meet specified requirements if the coupling of the duck with the wave motion is to be optimised. One stated parameter is that the natural period of oscillation of the duck about its turning axis when the duck is in water should approximately match the wave period to which the duck is to be coupled.

In practice there is a spectrum of wave periods (and thus wavelengths) likely to be encountered so that references to wave "period" or "wavelength" refer to a selected region of the spectrum at which peak coupling is desired. However, it will be appreciated that coupling at frequencies on either side of that chosen for peak coupling should fall off as little as is practicable. In other words a wide operating band is required.

This requirement can be met to some extent by design of the duck, as will be more fully described below, to achieve stiffness and inertia values as low as practicable in relation to the damping. The present invention provides a mechanism for controlling the force between the duck or like body and the restrained part in dependence upon sensed parameters of their relative movement. Thus a relatively simple control of the force to maintain the force proportional to relative velocity improves the efficiency of power take-off at frequencies either side of the natural resonance frequency. In a more sophisticated control mechanism according to the invention forces equivalent to negative stiffness and/or negative inertia are derived from the movement of the duck or like body and fed back effectively to adjust the stiffness and/or inertia in such a way as to improve the coupling over a band of wave frequencies beyond that which is practicable by straightforward engineering design of the duck or like body.

The invention provides, in one of its aspects, extracting power from waves on a water surface, which apparatus comprises a body which in operation is located on or near the water surface so as to be moved by waves, a part which is restrained from being moved by waves, means for extracting power from the relative movement between the said body and the said part, sensing means, sensitive to at least one of the group of parameters comprising displacement position, velocity and acceleration of the said relative movement, where displacement position is measured relative to the equilibrium position of the body when at rest in calm water, for generating an output signal indicative of the said at least one parameter, and feedback means for generating a force dependent upon the said output signal and for applying the force to the body.

Feedback force applied in this way in dependence upon the displacement position will alter the effective or apparent stiffness of relative movement between the body and the said part. As is well known stiffness is that property of a system which opposes change of position or angle.

Feedback force applied in this way in dependence upon the relative velocity will alter the effective damping. Feedback force applied in this way in dependence upon the relative acceleration will alter the effective or apparent inertia of the body. As is well known, inertia is that property of a body which opposes acceleration.

An important feature of the invention is the use of this feedback control to broaden the operating band of frequencies of the device by reducing the effective or apparent stiffness of the body and by reducing the effective or apparent inertia of the body.

Conveniently power is extracted from the relative movement of the said body and the said part using an hydraulic pump which is reversibly driveable as a motor. In that case, feedback of the force or forces to the body is most conveniently effected by appropriate pressure feedback in the hydraulic fluid to the pump/motor.

In one arrangement according to the invention, conversion to electrical power output is effected by driving a swash plate motor from the output of the pump, the swash plate motor being mechanically coupled to an electrical generator. Control equipment is provided to adjust continuously the angle of the swash plate for efficient running of the swash plate motor and the generator at constant speed, even although the pump driven by the reciprocating movement of the body will have wide speed variation. In this arrangement, feedback of the force to the body to alter its effective or apparent stiffness or inertia is most conveniently effected by supplementary adjustment of the angle of the swash plate in the swash plate motor.

The said sensing means may comprise one or more fluidic devices producing fluidic output signals which are processed and used for control as aforesaid by fluidic devices. Preferably the said sensing means produces an electrical signal output which is processed and used to provide feedback control electronically with an appropriate electromechanical transducer for the final output.

Conveniently an electrical signal output indicative of relative acceleration is provided by electronic differentiation of an electrical signal output from a tachometer indicating relative velocity between the body and the said part.

In seeking a simple solution to the problem of reducing the effective stiffness and/or the effective inertia, introduction of the equivalent of a negative spring or a negative inertia may be considered. In these cases the stiffness force fed back to the body will be proportional to the displacement of the body (but negative in the sense that the direction of the force is such as to tend to increase the displacement further) and the inertia force fed back to the body will be proportional to the acceleration of the body (but again negative in the sense that the direction of the force is such as to increase the acceleration further).

However, the apparatus of the invention lends itself to the provision of more sophisticated control. Thus the relationship between output signal and feedback force does not have to be linear.

For example, if effective negative stiffness is provided appropriately for operation at average wave amplitude, the tendency for the body to capsize and fail to recover from the capsize in higher seas becomes a problem. One solution involving a simple non-linearity in the relationship between output signal and feedback force is to arrange for a cut-off — that is for example no negative stiffness force is fed back when a predetermined displacement is exceeded. A more sophisticated solution would be to provide for a gradual reduction in the effect with increasing displacement beyond a predetermined displacement. Similar provision could readily be made in respect of the negative inertia force if this proved desirable.

A specific construction of apparatus embodying the invention will now be described by way of example and with reference to the drawings filed herewith, in which.

Figure 1:
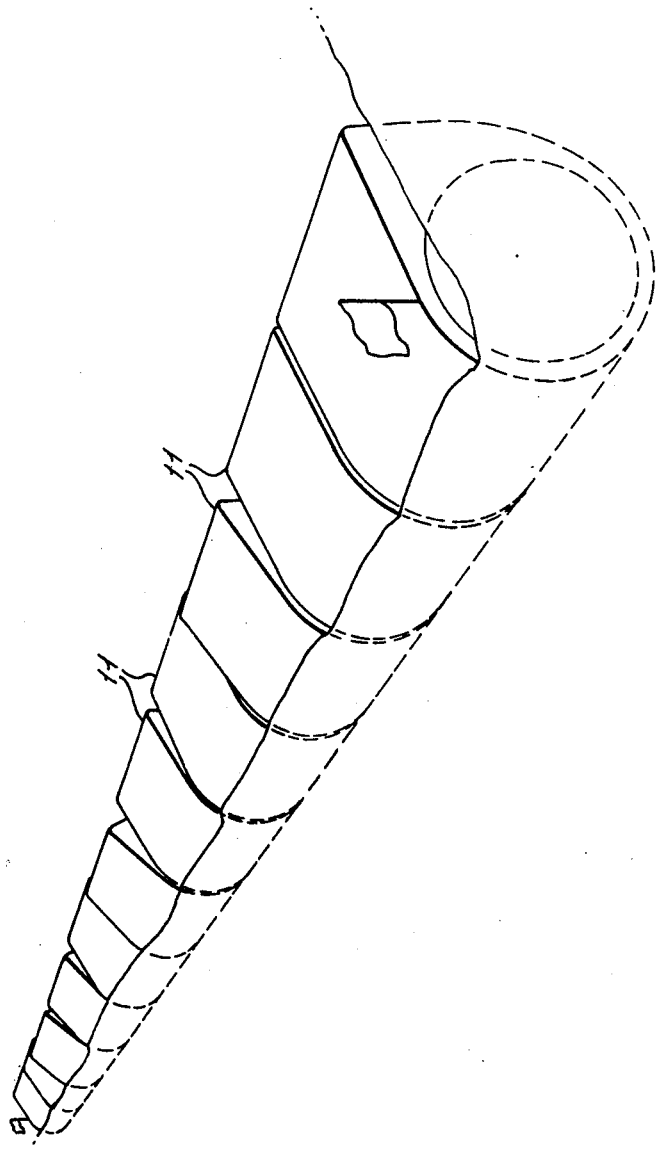
FIG. 1 is a diagrammatic perspective view of an apparatus for extracting energy from waves on water.

FIG. 1 is a diagrammatic representation in perspective of the apparatus at sea. It consists of a tubular backbone some 500 meters long, around which can rotate a number of specially shaped segments 11 known as "ducks". The combination of ducks 11 and backbone is called a 'string'. The string will generally be perpendicular to the prevailing wave direction just as a ship would broach to. Movements of the backbone are described using conventional nomenclature as for ships but the additional degree of freedom of the duck to rotate about the backbone is referred to as "nodding". The length of the string is taken to correspond with the beam of a ship (since the ducks are to watch oncoming waves) — thus pitch and nod occur about parallel axes.

Duck strings are intended to be loosely moored at sites with consistently good waves as close to shore as possible in 30 to 50 fathoms of water. The nodding of the duck about its axis produces useful work which is converted to electricity at sea. The nod amplitude will usually be less than half a radian and the peripheral velocities between duck and backbone are too slow by two orders of magnitude for conventional direct conversion to electricity. An hydraulic system is therefore employed in which radial piston units, efficient as both motor and pump, such as those produced by Poclain and McTaggart Scott are used and provide radial and axial location as well as power take off. Such units are used conventionally as wheel hub motors for slow heavy vehicles and have large axle load ratings. They are fitted with seals for marine and submarine applications. In the present example each duck 11 rides on as many as 100 such units to produce a flow of hydraulic oil at pressures of two or three thousand pounds per square inch. This is a high grade form of energy which is used to drive hydraulic swash plate motors at speeds compatible with electrical generation. Control of the angle of a swash plate allows the generator to run at a constant speed despite the periodicity of the duck nods.

For understanding the present invention it is necessary to appreciate the shape and design considerations involved in optimising the performance of a duck. This is explained in relation to FIGS. 2, 3 and 4.

Figure 2:
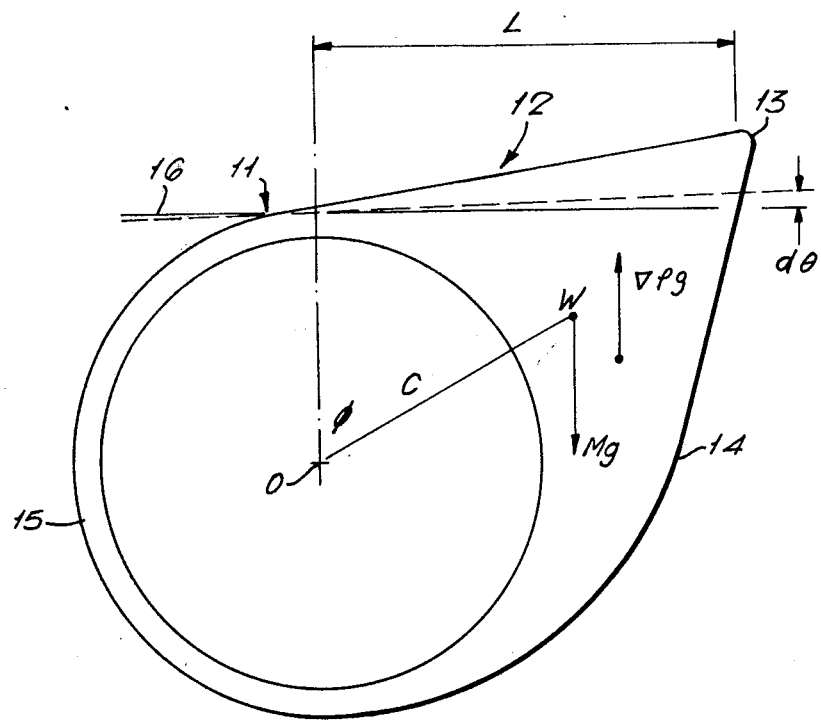
FIG. 2 is a diagrammatic cross-sectional view of part of the apparatus.

FIG. 2 shows a duck 11 mounted on its backbone in calm water expecting some waves to arrive from the right. It will nod about the point O. The flat part 12 of the duck out of the water is called the back. The highest point 13 is the beak. The curve 14 down from the beak 13 is the paunch and the remaining semicircle 15 is called, for reasons of delicacy, the stern.

This example represents the simplest design in which the stern 15 of the duck is in the shape of a cylinder coaxial with the nodding axis O so that nodding will not displace water astern. The diameter of this cylinder is the dimension used to describe the size of the duck. For the North Atlantic it will be between ten and fifteen meters, but for shorter waves in the North Sea or western Japanese waters it may be as little as six meters.

The curve of the paunch 14 is designed to allow the displacements of water in front of the duck 11, caused by a nod, to match as nearly as possible the sizes of the orbits of the water particles in an approaching wave of period at which best performance is required. The matching can only be approximate but quite large departures cause only a small difference.

Figure 4:
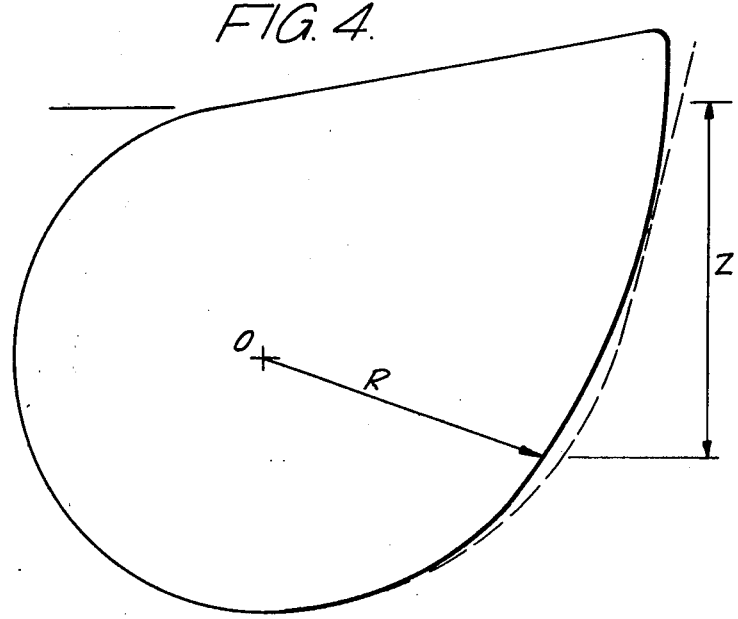
FIG. 4 illustrates curves for optimising the cross-sectional shape of part of the apparatus.
Figure 3:
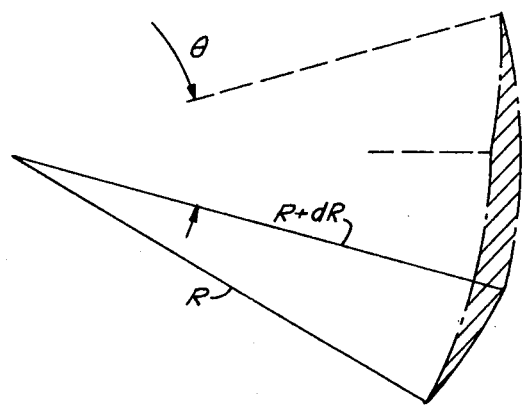
FIG. 3 is a diagrammatic representation of the effect of movement of a small part of the apparatus.

Consider the line in FIG. 3 whose ends are distant from O by $R$ and $R + dR$. As the line moves round O through an angle $\theta$ it sweeps out an area $\theta R dR$. In a deep water travelling wave with surface amplitude $A$ and wave length $\lambda$ the radius of orbit at a depth $Z$ is $Ae(-2\pi Z/\lambda)$. We can derive an equation for the paunch radius $R$ at any depth $Z$.

$$R = K e(-2\pi Z/\lambda)$$

and fix the value of K for $Z = 2R$ for some ratio of $\lambda/R$. The curve for $\lambda/R = -20$ is shown in FIG. 4. The dashed curve is a simple combination of an arc and tangent which may be used for convenience of marking out where the deviation from optimum shape is considered acceptable.

The duck freeboard is the distance from the beak 13 to the calm waterline 16. Appropriate choice of this distance can provide for the first stage of overload protection. The phase of nodding is such that for a wave in the middle of the working band the duck is at its calm water position as a crest arrives. Waves of amplitude greater than the freeboard will send water over the duck and so the freeboard dimension should be chosen to suit hydraulic and electrical overload limits. In the North Atlantic the economic power limits will be between 100 and 200 kilowatts per meter.

Flow of water across the duck's back has important implications in connection with mooring and drift forces. Longuet-Higgins has shown (see Longuet-Higgins, M. S., & Stewart, R. W., Radiation Stress in Water Wave: a physical discussion with applications. Deep Sea Research, Vol. 2, 529–562, 1964) that a perfect wave absorber should experience a direct beachward force in addition to all alternating forces and forces caused by currents. In waves of amplitude A it should have the value $$\tfrac{1}{2} \rho g A^2$$

per unit length, where $\rho$ = density of water and $g$ = acceleration due to gravity. A reflecting object would experience a force of double this value. Experiments with model ducks on a mounting fitted with strain gauges confirm this theory up to the point where water goes over the duck. When this happens a head of water builds up behind the model and offsets to an appreciable extent to the effects of the beachward forces. If this head is considered part of a transmitted wave then the theoretical prediction is still good.

The experiments were extended to test a circular cylinder held just awash across the tank. It should be nearly transparent to the waves and so it is. But the average of the forces on it shows a forward component. It is possible to siphon water from back to front, and when released, the model will move slowly but surely towards the wave maker. In summary, low freeboard gives automatic power limiting and facilitates mooring.

The largest direct effect is a force vertically down, often eight times larger than the static horizontal force. There is an old nautical tradition which finds strong support among both passengers and crew that conventional ships should stay on the surface in more or less the same attitude at all times. But unmanned wave machines threatened with excessive wave forces will be much safer below the surface. A mooring scheme was planned with a leading buoy designed to sink the duck string in very rough weather. It seems that the waves and Bernoulli will save us this trouble.

The stable position for an object floating in waves is with its length perpendicular to the prevailing wave direction. But it is possible to make use of the unidirectional forces for yaw control. By alterations to the hydraulic systems at one end of the string we can increase the amount of wave energy reflected from its usual low value and so move that end of the string down-wave.

In calm water the duck will lie as in FIG. 2. It will experience an upwards buoyancy force $\nabla \rho g$ (where $\nabla$ = volume of displaced water) at the centroid 17 of the displaced water and a downward force from its own centre of mass at W. It is not necessary that $\nabla \rho$ and M should be equal. It might be desirable, for example, that if a duck were to become detached it would be better for it to sink rather than to float about causing damage to its siblings. The backbone would provide the reserve buoyancy. The only requirement is for $\nabla \rho g$ and Mg to exert equal but opposite moments about O. The point of action of $\nabla \rho g$ is fixed by the duck shape but the position of W can be controlled by the distribution of material inside the duck. As will become apparent from the following discussion, ducks and ships differ in that the duck's centre of gravity will be placed as high as possible.

Ducks perform best at their undamped natural frequency. This frequency will be given by $$F = \frac{1}{2\pi} \sqrt{\frac{\text{Stiffness}}{\text{Inertia}}}$$

There are two factors affecting stiffness. The first is governed by the waterline length L in FIG. 2. A small clockwise nod of angle $d\theta$ will displace a triangular prism of water of volume $\frac{1}{2} L^2 d\theta$ per unit length of duck This will have a mass $\frac{1}{2} \rho L^2 d\theta$ and a centroid at $\frac{2}{3}L$ from the vertical through O.

The change of moment about O will be $\frac{1}{3} \rho g L^3 d\theta$ anti-clockwise and so the rate of change of moment with angle will be $\frac{1}{3} \rho g L^3$.

For large nod angles the problem is complicated by change in the value of L, but optimum efficiency is only required for small nod angles. Nodding stiffness is also affected by the position of the centre of mass W. If this is a distance of C from O and the line OW makes an angle $\phi$ with the vertical, then the moment about O is MgCsin$\phi$. Differentiating gives MgCcos$\phi$. When $\phi$ is acute then the move in the centre of mass tends to assist the nod which caused it and so the sum of the stiffness terms is $\frac{1}{3} \rho g L^3$ — MgCcos$\phi$ per unit length.

There are several terms which affect the nodding inertia. There is the obvious mechanical moment of inertia of the material (steel and concrete) of the duck. This is the sum of the products of the mass of each small part and the square of its distance from O. There is the inertia of the power take-off hydraulic pumps which may be turning twenty times faster than the ducks. Together these make up the total mechanical inertia (I mech). There is also the hydrodynamic inertia of the water influenced by the duck. Values for this have been calculated for some cross-sectional shapes and measured for others. For an ellipse of semi-major axis a and semi-minor axis b, it is $\frac{1}{8} \pi \rho (b^2 - a^2)^2$. For a circle it is zero. For a plate of half length b it is $\frac{1}{8} \pi \rho b^4$. If we consider the circle to be a special case of ellipse which happens to have a = b, and the plate to be another special case where a = o, then we see a gratifying consistency. One can argue that the active parts of a duck of shape as shown in FIG. 2 resemble a quadrant of an ellipse, from which may be suggested a value for the hydrodynamic inertia of $(1/32) \pi \rho (b^2 - a^2)^2$ where a and b are the semi-major axis and semi-minor axis respectively of the "equivalent" ellipse. But while books on naval architecture talk of *the* added inertia in the singular, the wave theoreticians believe that it is frequency-dependent. No satisfactory simple technique for experimental measurement has yet been devised and for the moment the following expression may therefore be used:

$$F = \frac{1}{2\pi} \sqrt{\frac{\frac{1}{3} \rho g L^3 - \text{MgCcos}\phi}{I \text{ mech} + \frac{1}{32} \pi \phi (b^2 - a^2)^2}}$$

When the duck is driven at its natural frequency the effects of stiffness and inertia cancel and the response is solely determined by the damping. This is largely the power take-off. When it is optimum the efficiency can be extremely high. If damping is increased then waves are reflected in such a phase as to produce an anti-node at the beak. When the damping is below optimum then again there is reflection but with a node at the beak. The transmitted wave is not much affected by the value of damping.

When the duck is driven by waves at frequencies different from the natural frequency then its behaviour is governed by stiffness at low frequencies and inertia at high frequencies. To make the operating band wide we require the stiffness and inertia values low in relation to the damping. In electronic terms we require a low selectively Q. The design procedure is as follows. The first component of the stiffness is determined by the waterline geometry. As much as possible of this is cancelled by reducing the angle $\phi$ by raising the centre of mass. The limit to this is the requirement that the duck should recover from a capsized position. Desirably this should be a natural recovery unassisted by reverse operation of the pumps. The inertia is then set to bring the remaining stiffness into resonance at the required frequency.

Figure 5:
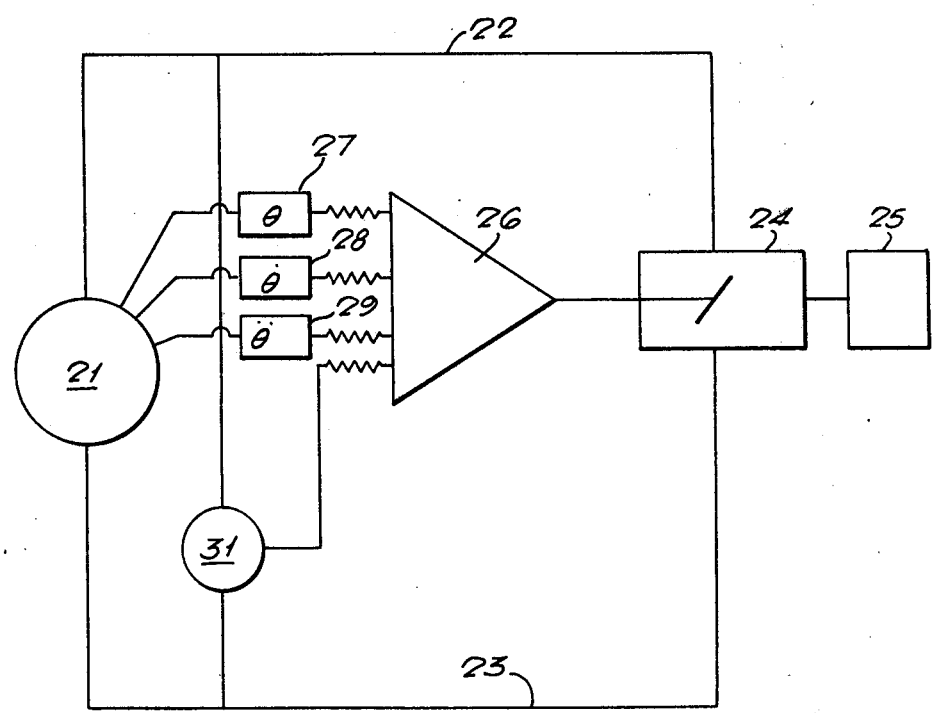
FIG. 5 is a diagrammatic representation of control equipment of the apparatus.

FIG. 5 is a diagrammatic representation of the apparatus embodying the present invention by which it is possible to control the damping force and to alter the effective or apparent stiffness and the effective or apparent inertia and thereby reduce the Q value of the system beyond that which is practicable by straightforward mechanical structure design.

Referring to FIG. 5, the duck and its associated equipment is represented at 21. Hydraulic pumps on the duck provide a pulsating flow of pressurised hydraulic fluid through line 22 with return via line 23. This hydraulic supply drives a swash plate motor 24, the output of which drives an electricity generator 25. Vital to the whole operation is control of the swash plate 24 effected through adjustment of the angle of the swash plate. This control is based upon an electrical signal output from an operational amplifier 26 which responds to various signal inputs derived from sensors of duck displacement, velocity and acceleration parameters, indicated by 27, 28, 29 and hydraulic fluid pressure at 31. As may be seen from FIG. 5, the sensor 31 is located to sense the difference in hydraulic fluid pressure between the output line 22 and the return line 23 of the hydraulic pumps.

Considering first the simple control of the motor 24 for most efficient use of the available energy in the pulsating hydraulic fluid supply, the generator 25 is to be driven at constant speed. The back pressure, dependent upon the swash plate angle determines the principal force acting between the duck 11 and its backbone. This back pressure is sensed by sensor 31. The simplest control system is to make this force a damping force which is proportional to the relative velocity between duck and backbone. The constant of proportionality affects efficiency but it is not especially critical either side of the optimum. Thus change by a factor of two reduces efficiency by only fifteen percent.

This control is achieved by a tachometer (28) which senses the angular velocity ($\dot{\theta}$) of the duck relative to the backbone and provides an input to the electrical network which is compared with the back pressure signal (31) and used by means of operational amplifier 26 to control the angle of the swash plate. The control signal provided by the operational amplifier 26 causes change in the angle of the swash plate such as to tend to maintain the back pressure proportional to the angular velocity of the duck relative to the backbone.

To introduce a negative stiffness to reduce the apparent stiffness in the angular movement of the duck a force proportional to angular displacement ($\theta$) is required. An appropriate input is provided by sensor 28 which modifies the output from operational amplifier 26. The consequent modification in control manifests itself in an adjustment in the back pressure in the hydraulic fluid which, in turn, appears as a change in the force between the duck and backbone. The effect may be considered as that for a small part of the cycle, the system is putting power into the water but it is amply repaid. The efficiency of operation at frequencies either side of the designed optimum frequency is improved, notably at high frequencies.

To introduce a negative inertia, to reduce the apparent inertia of the duck, a force proportional to angular acceleration ($\ddot{\theta}$) is required. An appropriate input is provided by sensor 29 which modifies the output of operational amplifier 26. Again, the consequent modification in the control manifests itself in this example as a change in back pressure in the hydraulic fluid.

The sensor 29 may generate its signal input to the operational amplifier 26 by electronic differentiation of the techometer output representing $\dot{\theta}$.

For more sophisticated control non-linearity in the relationship between the feedback force and the sensed angular displacement ($\theta$) or acceleration ($\ddot{\theta}$) may be introduced.

For example, the particular problem, referred to above, of ducks capsizing in high seas and failing to recover is enhanced by a negative stiffness. This can be avoided by a simple cut-off non-linearity, that is provision for the feedback to be cancelled for displacement ($\theta$) signals in excess of a predetermined limit. Alternatively a gradually diminishing constant of proportionality with increasing displacement ($\theta$) beyond a predetermined limit may be introduced.

The invention is not restricted to the details of the foregoing example. For instance the feedback force need not necessarily be fed back to the duck via pressure changes in hydraulic fluid but may be generated and applied to the duck in any convenient manner. The manner which is most convenient will depend to some extent upon the manner in which output power is taken from the ducks.

I claim:

1. Apparatus for extracting power from waves on a water surface, which apparatus comprises a body which in operation is located on or near the water surface so as to be moved by waves, a part which is restrained from being moved by waves, means for extracting power from the relative movement between the said body and the said part, sensing means, sensitive to at least one of the group of parameters comprising displacement position, velocity and acceleration of the said relative movement, where displacement position is measured relative to the equilibrium position of the body when at rest in calm water, for generating an output signal indicative of the said at least one parameter, and feedback means for generating a force dependent upon the said output signal and for applying the force to the body.

2. Apparatus as claimed in claim 1, wherein there is at least a component of feedback force dependent upon displacement position which is applied to the body to alter the apparent stiffness of relative movement between the body and the said part.

3. Apparatus as claimed in claim 2, wherein feedback means is controlled for applying a feedback force, at least one component of which is proportional to displacement and acts in a sense tending to increase displacement further.

4. Apparatus as claimed in claim 3, wherein the feedback means is controlled for applying, over a predetermined limited range of displacement positions of the body, a feedback force at least one component of which is proportional to displacement and acts in a sense tending to increase displacement further.

5. Apparatus as claimed in claim 1, wherein there is at least a component of feedback force dependent upon relative velocity between the said body and the said part, which is applied to the body to alter the effective damping upon the said relative movement.

6. Apparatus as claimed in claim 1, wherein there is at least a component of feedback force dependent upon relative acceleration between the said body and the said part, which is applied to the body to alter the apparent inertia of the body.

7. Apparatus as claimed in claim 6, wherein the feedback means is controlled for applying a feedback force, at least one component of which is proportional to acceleration and acts in a sense tending to increase acceleration further.

8. Apparatus as claimed in claim 7, wherein the feedback means is controlled for applying, over a predetermined limited range of relative accelerations between the body and the said part, a feedback force at least one component of which is proportional to acceleration and acts in a sense tending to increase acceleration further.

9. Apparatus as claimed in claim 1, wherein the feedback means is controlled to reduce the apparent stiffness of the body and to reduce the apparent inertia of the body, thereby to increase the range of frequencies of waves for which the efficiency of extraction of power by the apparatus exceeds a predetermined level.

10. Apparatus as claimed in claim 1, wherein in use power is extracted from the relative movement of the said body and the said part using an hydraulic pump which is reversibly driveable as a motor.

11. Apparatus as claimed in claim 10, wherein the said feedback means applies feedback force to the body by pressure feedback in the hydraulic fluid to the said hydraulic pump which is reversibly driveable as a motor.

12. Apparatus as claimed in claim 11, wherein conversion to electrical power output is effected by driving a swash plate motor from the output of the pump, the swash plate motor being mechanically coupled to an electrical generator.

13. Apparatus as claimed in claim 12, wherein control equipment is provided to adjust continuously the angle of the swash plate for efficient running of the swash plate motor and the generator at constant speed, the pump being driven by the reciprocating movement of the body with a wide speed variation.

14. Apparatus as claimed in claim 13, wherein the said feedback means is coupled to the control equipment to apply feedback force to the body by supplementary adjustment of the angle of the swash plate in the swash plate motor.

15. Apparatus as claimed in claim 1, wherein the said sensing means produces an electrical signal output which is processed and used for applying feedback force to the body via an electromechanical transducer.

16. Apparatus as claimed in claim 15, wherein electrical signal processing means provide an electrical signal output indicative of relative acceleration by electronic differentiation of an electrical signal output from a tachometer indicating relative velocity between the body and the said part.

* * * * *